Reissued Nov. 24, 1953

Re. 23,742

UNITED STATES PATENT OFFICE 23,742

FUNGICIDAL SALTS OF ALKYLENE BISDITHIOCARBAMIC ACID

William F. Hester, deceased, late of Drexel Hill, Pa., by Rohm & Haas Company, assignee, Philadelphia, Pa., a corporation of the State of Delaware No Drawing. Original No. 2,317,765, dated April 27, 1943, Serial No. 407,674, August 20, 1941. Application for reissue October 24, 1952, Serial No. 316,821

8 Claims. (Cl. 167—22)

Matter enclosed in heavy brackets [ ] appears in the original patent but forms no part of this reissue specification; matter printed in italics indicates the additions made by reissue.

This invention relates to fungicidal compositions suitable for application to living plants. More particularly it relates to fungicidal compositions containing as an active agent a compound of the formula

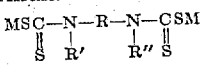

wherein R represents a divalent hydrocarbon group or a divalent aliphatic chain containing more than three carbon atoms separated by at least one nitrogen atom to form alkylene groups of at least two carbon atoms each, R′ and R″ taken individually represent hydrogen or taken jointly represent a divalent hydrocarbon group which in conjunction with the

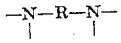

group forms a heterocycle, and M represents a salt-forming group or metal.

While sulfur and some of the sulfur-containing compounds are known to have fungicidal value, not all compounds containing sulfur are fungicidal. Nor are all sulfur compounds safe to use on living plants.

I have found that the sulfur-containing compounds of the above formula are exceptionally effective in fungicidal compositions and are low in phytocidal action. Thus compositions containing a compound of the formula

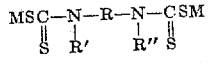

are useful for preventing and controlling fungus growth on living plants and are suprisingly more effective than previously known compounds which contain a single dithiocarbamate group or a thiuram grouping.

These compounds are prepared by reacting a polyamine and carbon disulfide, generally in the presence of a free base. In preparing them there may be used a di- or other poly-amine having hydrogen atoms available on nitrogen atoms in the amine groups. Suitable polyamines include ethylenediamine, propylenediamine, tetramethylenediamine, piperazine, paraphenylenediamine, diethylenetriamine, triethylenetetramine, tetraethylenepentamine, bis(aminoethyl) propylenediamine, etc. When one of these amines is reacted with carbon disulfide, there results the amine salt of a bisdithiocarbamic acid. If the reaction between amine and carbon disulfide is carried out in the presence of a strong base, the amine salt group is displaced and a salt formed from the cation of the base. As a base there may be used lithium, sodium, potassium, calcium, barium, etc. hydroxide or a strongly basic quaternary ammonium hydroxide, such as benzyl trimethyl ammonium hydroxide or dibenzyl diethyl ammonium hydroxide. A soluble salt of a bisdithiocarbamic acid may be converted to an insoluble or less soluble salt by metathesis.

The salt, whether soluble or insoluble, may be suspended or dissolved in an aqueous spray or may be mixed with or coated on a carrier, such as clay, magnesium carbonate, or similar inert material, and applied from a dust or from an aqueous spray. The salt may be used as the sole fungicidal material or it may be used in conjunction with other fungicidal agents. Also, the salt of a bisdithiocarbamic acid may be used in conjunction with an insecticidal agent or insecticidal agents.

Example 1

A mixture of 250 parts of 72% ethylenediamine and 480 parts of a 50% aqueous sodium hydroxide solution was stirred and externally cooled while 478 parts of carbon disulfide was added dropwise below the surface of the mixture. The addition of carbon disulfide required two hours, during which time the temperature was held below 25° C. The reaction mixture was further stirred for two hours at the end of which time it set to a solid. This was recrystallized from 1800 parts of anhydrous ethanol to give 868 parts of an air-dried solid which melted within the range of 85°–110° C. and which consisted essentially of the disodium salt of ethylene bisdithiocarbamic acid.

Tested against spores of Macrosporium sarcinaeforme Cav. the above product had a Bordeaux coefficient of 11 to 12 which is about threefold the coefficient of the dithiocarbamates which have heretofore been proposed for insecticidal or fungicidal uses and which is many times the coefficient for insoluble copper compounds which have been successfully used.

Applied in aqueous sprays to living plants, the compound as prepared above was highly effective in controlling black spot on rosebushes and scab on apple trees.

Example 2

A mixture of 302 parts of 73.5% propylenediamine and 320 parts of a 50% aqueous sodium hydroxide solution was stirred and externally cooled while 501 parts of carbon disulfide was added during a 45-minute period. The reaction was stirred for about two hours when it set to a solid mass, which was recrystallized from 700 parts of anhydrous ethanol. There was obtained 700 parts of a solid, melting between 55° C. and 60° C. The product was finely powdered and applied from aqueous sprays to plants without evidence of phytocidal action. At one pound per hundred gallons of spray excellent control of black spot on roses was obtained.

Example 3

The sodium salt of ethylene bisdithiocarbamic acid was prepared as in Example 1 and 2200 parts of the crystallized product dissolved in 10,000 parts of water. A solution containing 2200 parts of crystalline copper sulfate, dissolved in 10,000 parts of water, was mixed therewith, resulting in precipitation of a copper salt. The precipitate was filtered, washed, and dried. The product amounted to 2278 parts and corresponded by analysis to $(—SSCHNC_2H_4NHCSS—)Cu$. It was finely ground and used in suspension in aqueous sprays which were applied to living plants with complete control of fungus thereon.

In an entirely comparable manner there may be prepared other insoluble or relatively insoluble salts of the bisdithiocarbamic acids, such as the ferrous or ferric salts, the zinc salt or the cadmium salt. All of these salts have been tested and found effective fungicidally. In one series of tests these salts were applied to roses in a garden where powdery mildew was present. The sprays were prepared with two pounds of a given salt per hundred gallons of spray. In some tests wetting and spreading agents were used. After three applications the incidence of disease was observed and rated on a scale from ten to zero, the lower numbers being best. The unsprayed sections were rated at 3.3 and sections sprayed with flotation sulfur were also rated at 3.3. The section sprayed with the above copper bisdithiocarbamate were rated at 0.5; that with the ferrous salt at 1.0; that with ferric salt with a wetting agent prepared by reacting polyglycerol, cocoanut fatty acid, and phthalic anhydride at 0.9; and that with ferrous salt, with or without wetting agents, 2.3.

Pea seeds were dusted in a tumbler with 0.25% of their weight of powdered compounds and planted three-quarters of an inch deep. The per cent. emergence was noted at the end of the first week and after the second, third, and fourth weeks. With the sodium salt of ethylene bisdithiocarbamate the per cent. emergence was found at these times to be 18, 32, 45, and 63; with the cadmium salt 43, 50, 56, and 64. With untreated seed emergence was 1, 3, 8, and 20 while seed treated with a standard mercury preparation for preventing damping-off gave emergence figures of 5, 7, 12, and 23.

I claim:

[1. A fungicidal composition having as an active ingredient a salt of an alkylene bisdithiocarbamic acid.]

[2. A fungicidal composition having as an active ingredient a salt of ethylene bisdithiocarbamic acid.]

[3. A fungicidal composition having as an active ingredient the disodium salt of ethylene bisdithiocarbamic acid.]

[4. A fungicidal composition having as an active ingredient the cupric salt of ethylene bisdithiocarbamic acid.]

[5. A fungicidal composition having as an active ingredient the ferric salt of ethylene bisdithiocarbamic acid.]

*6. The process of controlling fungus growth on living plants which comprises applying to the plant a fungicidal composition having as an active ingredient a salt of an alkylene bisdithiocarbamic acid.*

*7. The process of controlling fungus growth on living plants which comprises applying to the plant a fungicidal composition having as an active ingredient a salt of ethylene bisdithiocarbamic acid.*

*8. The process of controlling fungus growth on living plants which comprises applying to the plant a fungicidal composition having as an active ingredient a bivalent metal salt of ethylene bisdithiocarbamic acid.*

*9. The process of controlling fungus growth on living plants which comprises applying to the plant a fungicidal composition having as an active ingredient the sodium salt of ethylene bisdithiocarbamic acid.*

*10. The process of controlling fungus growth on living plants which comprises applying to the plant a fungicidal composition having as an active ingredient the cupric salt of ethylene bisdithiocarbamic acid.*

*11. The process of controlling fungus growth on living plants which comprises applying to the plant a fungicidal composition having as an active ingredient the ferric salt of ethylene bisdithiocarbamic acid.*

*12. The process of controlling fungus growth on living plants which comprises applying to the plant a fungicidal composition having as an active ingredient the zinc salt of ethylene bisdithiocarbamic acid.*

*13. The process of controlling fungus growth on living plants which comprises applying to the plant a fungicidal composition having as an active ingredient the cadmium salt of ethylene bisdithiocarbamic acid.*

ROHM & HAAS COMPANY,
*Assignee of William F. Hester, deceased,*
By STANTON C. KELTON,
*Secretary.*

References Cited in the file of this patent or the original patent

UNITED STATES PATENTS

| Number | Name | Date |
|---|---|---|
| 1,972,961 | Tisdale et al. | Sept. 11, 1934 |
| 2,243,477 | Hester | May 27, 1941 |
| 2,243,544 | ter Horst | May 27, 1941 |
| 2,297,557 | Hester et al. | Sept. 29, 1942 |
| 2,338,380 | Hester et al. | Jan. 4, 1944 |
| 2,384,306 | Hester et al. | Sept. 4, 1945 |

OTHER REFERENCES

Levi et al., Gazzetta Chimica Italiana, vol. 59, pages 681 to 686 (1929).

A. Ya. Yakubovich et al., Chemical Abstracts, vol. 34, page 3685.